J. BLUE.
Straw Carrier.
No. 10,202.
Patented Nov. 8, 1853.
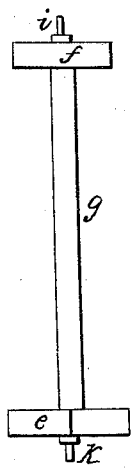
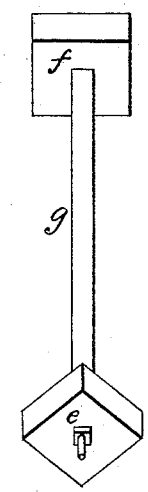
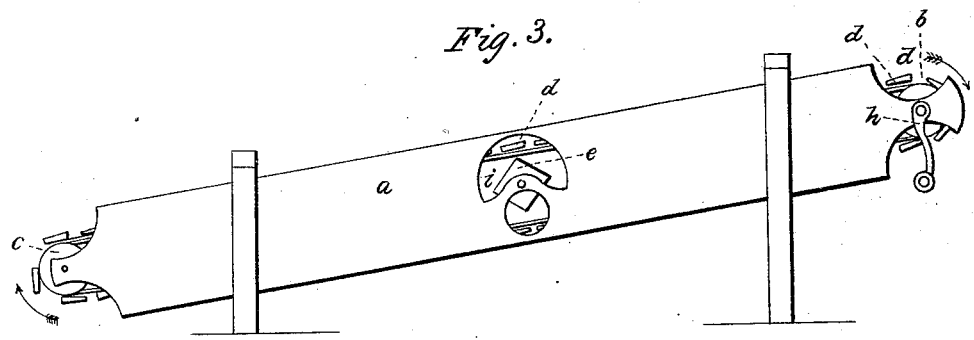

UNITED STATES PATENT OFFICE.

JOHN BLUE, OF COVERT, NEW YORK.

CARRIER TO GRAIN-SEPARATORS.

Specification of Letters Patent No. 10,202, dated November 8, 1853.

*To all whom it may concern:*

Be it known that I, JOHN BLUE, of Covert, in the county of Seneca and State of New York, have invented a new and useful Improvement in Machines for Separating Grain from the Straw, and that the following is a full, clear, and exact description of the principle or character which distinguishes my invention from all other things before known and of the manner of making, constructing, and using the same, reference being had to the accompanying drawings, making a part of this specification, in which—

Figure 1 is a plan of my improved shaker detached from the machine in which it is used; Fig. 2 a representation of it in perspective, and Fig. 3 an elevation of a hand machine with the shaker as improved by me in its proper place.

The same letters indicate like parts in all the figures.

Figs. 1 and 2 are drawn on a scale of one inch, and Fig. 3 of half an inch, for every foot.

The perfect separation of grain from straw, which for that purpose is shown upon an endless belt of slats, rods, or wires, during its passage over the belt, requires a jogging or some other vibrating motion in the upper part of the belt, in addition to its passage around the rollers which suspend it. For giving this part of the belts the necessary motion, it has usually been permitted to sag by its weight between the rollers which suspend it, either upon an eccentric which it is turned by a pulley driven with a belt from other parts of the machine, or upon rollers, having several corners, which revolve and shake the upper part of the belt, by its weight and motion around the rollers which suspend it, and consequent friction and traction against the corners of the rollers upon which it sags. The former device not only consumes all the power required to give the belt the jogging motion by turning the eccentric with the weight of the belt upon it, but it makes the machine more complicated, and is consequently so much the more liable to derangement; and the latter not only consumes all the power required to give the belt the jogging motion by the friction and traction against the corners of the rollers, acting with much disadvantage because of the disadvantageous direction of the forces with regard to the centers of motion of the rollers, but they are liable to stop, because of that disadvantageous direction of the forces. My improvement greatly lessens these evils, by rendering the machine less complicated, and causing the gravity or downward motion of one side of the belt to contribute toward the upward motion of the other side, in addition to the friction and traction of the belt against the corner of the roller raising it.

It consists in connecting the cornered roller on either side, to another on the other side, opposite, with the same number of corners or arms, by fastening both on a shaft in such a manner, that when either side of the belt rests upon one corner or arm of the roller on that side, the other side rests upon the side of the roller, between the corners, or on the ends of two arms.

In the accompanying drawings *a* represents a frame supporting a driving and suspending roller, *b*, and suspending roller, *c*, which suspend an endless belt, *d*, either, or all of which may be of any desired construction; *e* represents one of the rollers of my improved shaker, *f* the other, and *g* the shaft which connects them together.

My improved shaker is made by boring a hole one inch in diameter perpendicularly through the flat side of a block of wood two inches thick, and squared so as to have four corners about four inches from the hole, as represented by roller *e*, and inserting in this hole a wooden shaft of a size to fit tightly, as represented by the shaft *g*. Into the end of this shaft where it comes through the block far enough for a shoulder, is driven a piece of round iron for a gudgeon, as represented by the gudgeon *h*, and the block kept to its place by wedging or nailing. Upon the other end of the shaft is fastened in the same manner another block of the same size and form, and the same distance from it as the endless belts or chains of which the endless belt of slats, rods, or wires, is constructed are from one another in such a manner that when laid upon a horizontal plane, one of the sides of one block, and one of the corners with the center perpendicular to it of the other, will touch the plane as represented by Fig. 2, and like the other end an iron gudgeon is inserted in this end of the shaft when it comes through the block far enough for a shoulder, as represented by the gudgeon *l*. In order to give the belt a lighter shake the number of angles on each block may be any required number more than four, but equal on each roller on the same shaft; and in order to give it a heavier shake, the number may be less.

Iron may be substituted for the blocks of wood by having arms project from the center in the places of the corners of the blocks, with much advantage in durability, and but little augmentation of expense.

The shaker is put in its place by inserting the gudgeons in sockets in each side of the machine, as such an elevation from the upper part of the belt, that it will run nearly on a straight line from roller $c$ to roller $b$, passing over, and the endless belts or chains of which it is constructed resting on, and supported by, the blocks $e$ and $f$.

The machine is used by throwing grain and straw, either by hand, or from a threshing cylinder in the manner in which it is usually thrown upon such belts, upon the top of the belt near the roller $c$, and running the roller $b$, either with the crank $h$, or as such rollers are usually turned by motion communicated from other parts of separators, threshers or reapers, in the direction in which the arrows point; by which the belt, $d$, moves in the direction, and falls upon the side, $l$, of the roller, $e$, which rolls upon the gudgeons of the shaft $g$, (which is not seen in Fig. 3,) and communicates the impulse, through it, to the rollers, $f$, which by this impulse, in conjunction with the friction of the belt on that other side against one of its corners, raises the belt from the position on roller $f$ in which roller $e$ is after the belt falls upon its side $l$, to that in which it is represented in the draft; and at either side of the belt falls alternately upon the sides of the angled rollers, the forces generated are communicated through the shaft, $g$, to the other angled roller, which raises the belt on that side upon one of its corners or angles, and the straw is thus shaken up, and carried, and discharged, from the upper end of the belt, by its jogging motion over the angled rollers $e$ and $f$, and its motion around the suspending rollers $b$ and $c$, and the grain falls through the belt, upon whatever is placed underneath to receive it.

My improved shaker may be used for shaking belts for a hand separator, for a separator attached or combined with a threshing machine as they are usually attached and combined, and for a separator attached to or combined with a threshing machine attached to or combined with a reaping machine as they are usually attached and combined, and when used for either, the make, the construction, and the operation, are the same; the rollers being in all cases fastened on a shaft, as herein described, and the shaker placed under, and the straw thrown upon, the upper portion of the belt, and the motion communicated from the belts or chains of which the endless belt of slats, wires, or rods, is constructed, which rest upon the rollers, and which are moved by any of the known methods of moving them.

I claim—

The arrangement of the cam blocks $f$, and $e$, or their equivalents, on the shaft $g$, as shown in Fig. 2, of the drawing, for agitating the endless apron, as set forth.

JOHN BLUE.

Witnesses:
BENJ. DUNNING,
R. C. TOMPKINS.